(12) United States Patent
Nagata et al.

(10) Patent No.: US 10,148,150 B2
(45) Date of Patent: Dec. 4, 2018

(54) LIQUID PUMP

(71) Applicant: DENSO CORPORATION, Kariya, Aichi-pref. (JP)

(72) Inventors: Kiyoshi Nagata, Kariya (JP); Tetsuo Hayakawa, Kariya (JP); Masaya Ootake, Kariya (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 14/912,529

(22) PCT Filed: Sep. 3, 2014

(86) PCT No.: PCT/JP2014/004529
§ 371 (c)(1),
(2) Date: Feb. 17, 2016

(87) PCT Pub. No.: WO2015/040811
PCT Pub. Date: Mar. 26, 2015

(65) Prior Publication Data
US 2016/0201623 A1    Jul. 14, 2016

(30) Foreign Application Priority Data

Sep. 17, 2013 (JP) .................................. 2013-191594

(51) Int. Cl.
*F04D 13/06* (2006.01)
*H02K 5/22* (2006.01)
(Continued)

(52) U.S. Cl.
CPC ............... *H02K 5/22* (2013.01); *F02M 37/08* (2013.01); *F04D 3/005* (2013.01); *F04D 5/002* (2013.01);
(Continued)

(58) Field of Classification Search
CPC .. F04D 25/0693; F04D 29/58; F04D 29/5806; F04D 29/5813; F04D 29/586;
(Continued)

(56) References Cited

U.S. PATENT DOCUMENTS 4,966,532 A * 10/1990 Fengsheng ............ F04D 13/083
277/409
5,616,973 A * 4/1997 Khazanov ................ H02K 5/20
310/54

(Continued)

FOREIGN PATENT DOCUMENTS

JP          3-45065        4/1991
JP        2004-263564      9/2004
(Continued)

OTHER PUBLICATIONS

International Search Report and Written Opinion for PCT/JP2014/004529, dated Dec. 2, 2014, 10 pages.

*Primary Examiner* — Charles Freay
*Assistant Examiner* — Thomas Fink
(74) *Attorney, Agent, or Firm* — Nixon & Vanderhye P.C.

(57) ABSTRACT

A cover end of a fuel pump is formed by resin molding and has a tubular portion, which holds a bearing that is placed along a central axis of the tubular portion and rotatably supports one end portion of a shaft of a motor arrangement. Furthermore, three terminals, which supply three-phase electric power received from an outside to windings on a phase-by-phase basis, are insert molded in the cover end. In the cover end, a first transverse passage, which is formed between the first terminal and the second terminal in a circumferential direction, and a second transverse passage, which is formed between the second terminal and the third terminal in the circumferential direction, are configured into (Continued)

a form of V-shape, which diverges in a radially outer direction, in a view taken in an axial direction.

11 Claims, 5 Drawing Sheets

(51) Int. Cl.
| | |
|---|---|
| *F04D 3/00* | (2006.01) |
| *F04D 29/18* | (2006.01) |
| *F04D 29/52* | (2006.01) |
| *F02M 37/08* | (2006.01) |
| *F04D 5/00* | (2006.01) |
| *F02M 37/10* | (2006.01) |

(52) U.S. Cl.
CPC ......... *F04D 13/06* (2013.01); *F04D 13/0693* (2013.01); *F04D 29/181* (2013.01); *F04D 29/528* (2013.01); *F02M 37/10* (2013.01); *F02M 2037/082* (2013.01)

(58) Field of Classification Search
CPC ............. F04D 29/5873; F04D 13/0653; F04D 13/0693; F04D 3/005; H02K 3/24; H02K 5/20; H02K 2209/00; F02M 2037/082; F02M 2037/08; F02M 37/10
See application file for complete search history.

(56) References Cited

U.S. PATENT DOCUMENTS

| | | | |
|---|---|---|---|
| 9,169,833 B2* | 10/2015 | McCormick | F04D 5/002 |
| 2002/0106290 A1* | 8/2002 | Bader | F04D 13/06 |
| | | | 417/366 |
| 2009/0155100 A1* | 6/2009 | Genster | F04D 1/04 |
| | | | 417/410.1 |
| 2010/0034674 A1* | 2/2010 | Oota | F02M 37/08 |
| | | | 417/410.1 |
| 2010/0139896 A1* | 6/2010 | Chamberlin | H02K 5/225 |
| | | | 165/104.33 |
| 2011/0020154 A1 | 1/2011 | Matsuda et al. | |
| 2012/0027629 A1* | 2/2012 | Tanahashi | F04D 5/002 |
| | | | 417/410.1 |
| 2013/0028760 A1* | 1/2013 | Lin | F04D 7/06 |
| | | | 417/410.1 |
| 2013/0162098 A1* | 6/2013 | Furuhashi | H02K 3/38 |
| | | | 310/215 |
| 2013/0315759 A1* | 11/2013 | Hayakawa | H02K 3/46 |
| | | | 417/420 |
| 2016/0049840 A1* | 2/2016 | Honda | H02K 3/522 |
| | | | 310/71 |

FOREIGN PATENT DOCUMENTS

| | | |
|---|---|---|
| WO | WO 2015/040812 | 3/2015 |
| WO | WO 2015/040813 | 3/2015 |
| WO | WO 2015/040814 | 3/2015 |

\* cited by examiner

LIQUID PUMP

CROSS REFERENCE TO RELATED APPLICATION

This application is the U.S. national phase if International Application No. PCT/JP2014/004529 filed on Sep. 3, 2014 and is based on and incorporates herein by reference Japanese Patent Application No. 2013-191594 filed on Sep. 17, 2013.

TECHNICAL FIELD

The present disclosure relates to a liquid pump.

BACKGROUND ART

Previously, a liquid pump, which rotates a rotatable member, such an impeller, by a motor arrangement received in an inside of the liquid pump to pump liquid, is known. In general, in the liquid pump having the above-described motor arrangement, the liquid, which is drawn through a suction port formed at one axial end of the liquid pump, is pressurized and is discharged to an outside through a discharge port formed at the other axial end of the liquid pump.

A discharge conduit, which forms the discharge port, is formed integrally with a cover end made of resin in such a manner that the discharge conduit projects from the axial end portion of the liquid pump. A tubular portion, which holds a bearing that rotatably supports one end portion of a shaft of the motor arrangement, is formed in an inside of the cover end along a central axis of the cover end. Furthermore, an end portion of a stator of the motor arrangement, specifically, a stator winding portion, and winding connections for connecting with windings are molded with resin for the purpose of electrical insulation.

For example, in a fuel supply pump recited in the Patent Literature 1, the winding portion, a dielectric molded portion of the winding portion, and the cover end located at the discharge port side end portion of the fuel supply pump in the axial direction are formed integrally with the resin. Communication passages, each of which communicates between a radially inner side of the cover end and a radially outer side of the cover end, are formed. The fuel, which is pumped from the pump arrangement, flows from a second fuel supply passage, which is formed between an outer peripheral portion of the stator core and an inner peripheral portion of a housing, into a fuel merging portion located on the radially inner side through the communication passages.

In the construction of the Patent Literature 1, circumferential portions of the cover end, which are other than the communication passages, become thick wall portions made of the molded resin. In general, the thick wall portion accumulates the greater amount of heat in comparison to a thin wall portion at the time of resin molding to cause generation of a sink mark and/or deformation due to localized shrinkage of the resin material. Particularly, when the sink mark and/or the deformation is formed in the tubular portion, which holds the bearing that rotatably supports the one end portion of the shaft, it will cause deviation of the central axis of the shaft or tilt of the central axis of the shaft at the time of installing the shaft. Thereby, required axis accuracy of the shaft, such as required coaxiality or required perpendicularity of the shaft, cannot be ensured. As a result, the operational performance or the durability of the motor arrangement may possibly be adversely influenced.

CITATION LIST

Patent Literature

Patent Literature 1: JP2010-63344A (corresponding to US2010/0034674A1)

SUMMARY OF INVENTION

The present disclosure is made in view of the above point. It is an objective of the present disclosure to provide a liquid pump, in which one end portion of a stator and a cover are integrally resin molded, while required axis accuracy of a motor arrangement is ensured.

A liquid pump of the present disclosure includes a motor arrangement, a housing, a cover end and a pump arrangement.

The motor arrangement has: a stator, in which a plurality of windings is wound around cores; and a rotor, which includes a plurality of magnetic poles and is rotated about a rotational axis of a shaft by a magnetic field generated at the stator.

The housing, which is configured into a tubular form, receives the stator and the rotor. A plurality of outer passages, each of which passes between an inner wall of the housing and an outer wall of the stator and extends through the motor arrangement in an axial direction, is formed in the housing.

The cover end is resin molded integrally with one end portion of the stator on one axial side of the motor arrangement and closes an opening of the housing. A tubular portion, which holds a bearing that rotatably supports one end portion of the shaft, is formed along a central axis at a side of the cover end where the motor arrangement is located. A discharge conduit, which has a discharge passage in an inside of the discharge conduit, is formed at an opposite side of the cover end, which is opposite from the motor arrangement. A first terminal, a second terminal and a third terminal, which supply three-phase electric power received from an outside to the plurality of windings on a phase-by-phase basis, are insert molded in the cover end.

The pump arrangement includes a rotatable member, which is rotated together with the rotor on another axial side of the motor arrangement to pump liquid.

The first terminal, the second terminal and the third terminal are arranged one after another in this order at predetermined intervals in a circumferential direction on an opposite side of an imaginary plane that includes the central axis of the cover end. The opposite side of the imaginary plane is opposite from another side of the imaginary plane where the discharge conduit is formed.

The cover end includes a plurality of transverse passages, which are formed by a plurality of slide mold parts, while each of the plurality of transverse passages radially communicates a corresponding one of the plurality of outer passages to an inner passage, which is formed around the tubular portion and is communicated with the discharge passage.

The plurality of transverse passages includes a first transverse passage, which is formed between the first terminal and the second terminal in the circumferential direction, and a second transverse passage, which is formed between the second terminal and the third terminal in the circumferential direction, while the first transverse passage and the second transverse passage are configured into a form of V-shape, which diverges in a radially outer direction, in a view taken in the axial direction.

As a countermeasure that reduces the press mark and the deformation caused by the thick wall portion at the time of molding, it is effective to divide the thick wall portion by forming the first transverse passage and the second transverse passage. However, if the first transverse passage and the second transverse passage are formed to be parallel to each other, the volume of the resin portion, which is located between the first transverse passage and the second transverse passage and has the second terminal embedded therein, cannot be made small.

When the first transverse passage and the second transverse passage are configured into the form of V-shape, which diverges in the radially outer direction, in the view taken in the axial direction, the volume of the resin portion, in which the second terminal is embedded, can be minimized. Thus, it is possible to limit the deterioration of the coaxiality or the perpendicularity of the tubular portion caused by the sink mark and/or the deformation at the molding time, and thereby it is possible to ensure the appropriate axis accuracy of the motor arrangement.

The windings of the stator are wound around the six cores, which are equally divided in the circumferential direction. In such a case, when the first terminal, the second terminal and the third terminal are arranged one after another at 60 degree intervals, the positional relationship between each of the terminals and the cores can be equally set in good balance. Here, the angle of 60 degrees refers to an angle in a range that can be recognized as 60 degrees in view of the technical common sense in the technical field of the present disclosure, and thereby the angle of 60 degrees is not limited to the exact angle of 60 degrees.

Furthermore, when the first terminal, the second terminal and the third terminal are respectively made of the identical members, which are identical to each other, a reduction in the number of steps under control and an improvement in the efficiency of the assembling operation can be achieved.

Furthermore, in a mold, which is used to mold the cover end, a mold opening direction of the mold is the axial direction, and the transverse passages, each of which extends in a corresponding direction that is perpendicular to the axial direction, are formed by slide mold parts, each of which moves in a direction of a corresponding parting line. In this case, when the first transverse passage and the second transverse passage are formed to be perpendicular to each other, the structure of the slide mold parts can be simplified. Here, the term "perpendicular" refers to the state of perpendicularity with an achievable accuracy that is achievable in the resin molding and thereby the term "perpendicular" does not necessarily refers to the exact angle of 90 degrees.

The principle of the present disclosure with respect to the liquid pump discussed above is applicable to a fuel pump that pumps fuel (fuel as liquid), which is drawn from a fuel tank. For example, a fuel pump for a vehicle is required to have a high quality to continuously implement a stable performance of the fuel pump. When the fuel pump of the present disclosure is applied, it is possible to ensure the appropriate axis accuracy of the motor arrangement. Thereby, it is possible to stabilize the pump performance that is achieved with the rotatable member, which is rotated by the motor arrangement.

DESCRIPTION OF EMBODIMENTS

Figure 1:
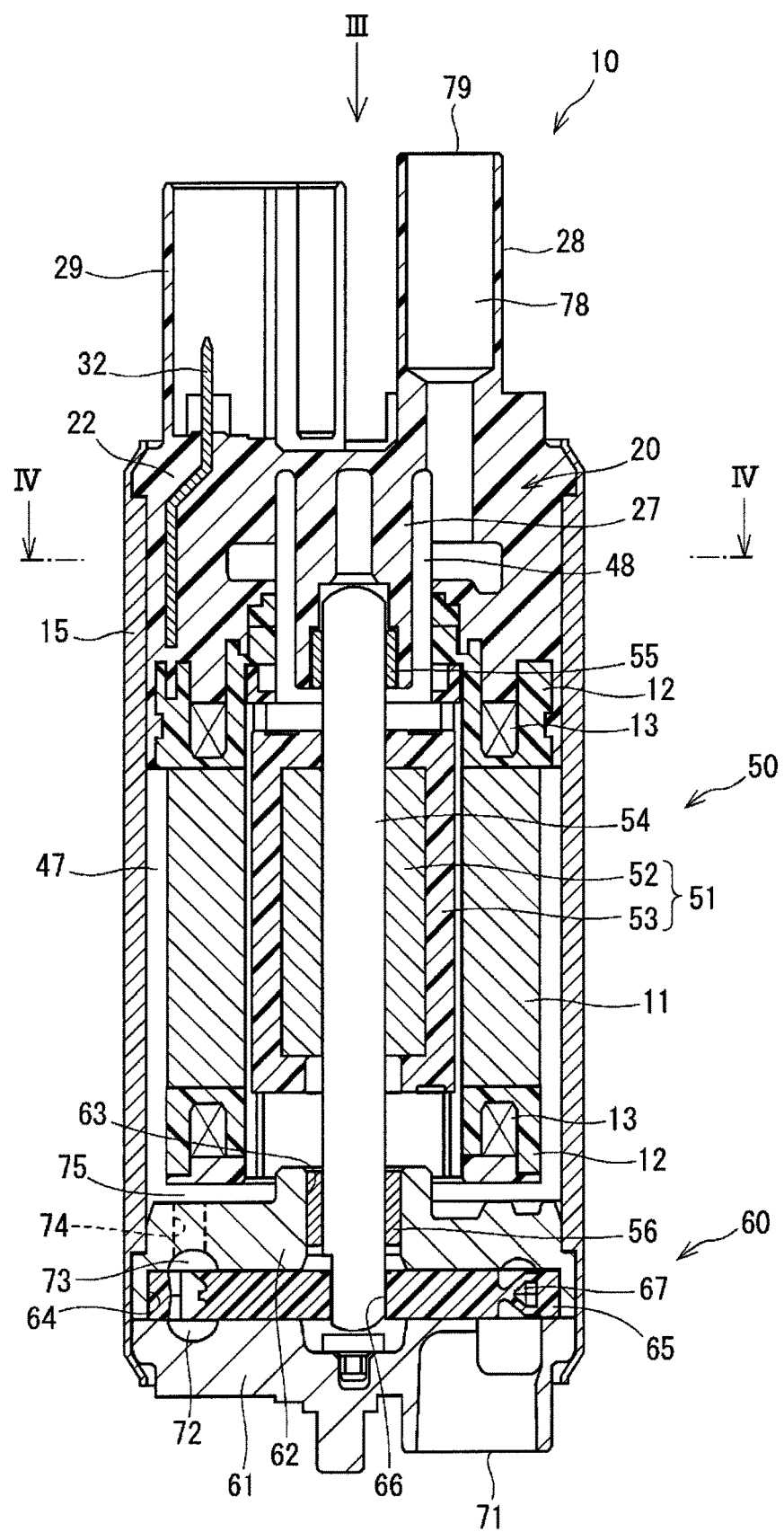
FIG. 1 is an axial cross-sectional view of a fuel pump according to an embodiment of the present disclosure, indicating a cross section taken along line I-I in FIG. 4.

Hereinafter, an embodiment of the present disclosure will be described with reference to the accompanying drawings.

A fuel pump, which serves as a liquid pump, according to the embodiment of the present disclosure will be described with reference to FIGS. 1 to 4.

The fuel pump 1 draws fuel of a fuel tank (not shown) through a suction port 71 and discharges the drawn fuel from a discharge port 79, which is an opening of a discharge conduit 28, to an internal combustion engine. The fuel pump 1 includes a motor arrangement 50 and a pump arrangement 60. An outer shell of the fuel pump 1 includes a housing 15, a cover end 20 and a pump cover 61. In the following description of the fuel pump 1, the upper side of FIGS. 1 and 2 will be referred to as a discharge port 79 side, and the lower side of FIGS. 1 and 2 will be referred to as a suction port 71 side.

The housing 15 is configured into a cylindrical tubular form and is made of metal (e.g., iron).

The cover end 20 is molded from a resin material, such as PPS (polyphenylene sulfide), which is resistant to the fuel. The cover end 20 is molded integrally with one end portion of a stator 11 at the discharge port 79 side of the motor arrangement 50 in the axial direction. That is, the one end portion of the stator 11 is insert molded in the cover end 20. The cover end 20 closes an opening of the housing 15, which is located on the side where the discharge port 79 is placed. A tubular portion 27, which holds a bearing 55 that rotatably supports one end portion of a shaft 54, is formed in an inside of the cover end 20, i.e., is formed along a central axis O of the motor arrangement 50 at a side of the cover end 20 where the motor arrangement 50 is located. In the present embodiment, the central axis O of the cover end 20 also serves as a rotational axis of the shaft 54.

The discharge conduit 28 is formed integrally with an outer side of the cover end 20, specifically, is formed integrally with an opposite side of the cover end 20, which is opposite from the motor arrangement 50, at one side (a right side in FIG. 3) of a reference plane S (see FIGS. 3 and 4), which is an imaginary plane that includes the central axis O of the cover end. Furthermore, at the other side (a left side in FIG. 3) of the reference plane S, three terminals, i.e., a first terminal 31, a second terminal 32 and a third terminal 33 are insert molded in the cover end 20, and a connector 29 projects from and is formed integrally with the cover end 20. That is, the discharge conduit 28, the connector 29 and the terminals 31, 32, 33 are placed in a manner that avoids an interference therebetween.

The discharge conduit 28 has a discharge passage 78 in an inside of the discharge conduit 28, and another conduit, which conducts the discharged fuel to a downstream side, is connected to the discharge conduit 28.

An electric power cable, which extends from an external drive device, is connected to the first terminal 31, the second terminal 32 and the third terminal 33, and the first terminal 31, the second terminal 32 and the third terminal 33 supply three-phase electric power to a plurality of windings 13 of the motor arrangement 50. For example, the first terminal 31, the second terminal 32 and the third terminal 33 correspond to, for example, a U-phase, a V-phase and a W-phase, respectively. However, the arrangement of the U-phase, the V-phase and the W-phase is not limited to this arrangement.

Furthermore, in the present embodiment, the three terminals 31, 32, 33 are arranged one after another at 60 degree intervals about the central axis O of the cover end 20 in response to the presence of six cores 12 of the stator 11, which will be described later and are arranged one after another in a circumferential direction.

Furthermore, in the present embodiment, the three terminals 31, 32, 33 are respectively made of identical members, which are identical to each other.

When the discharge port 79 side end portion of the housing 15 is radially inwardly crimped against the cover end 20, the cover end 20 is fixed at the inside of the housing 15. Thereby, removal of the cover end 20 from the housing 15 in the axial direction is limited.

Figure 4:
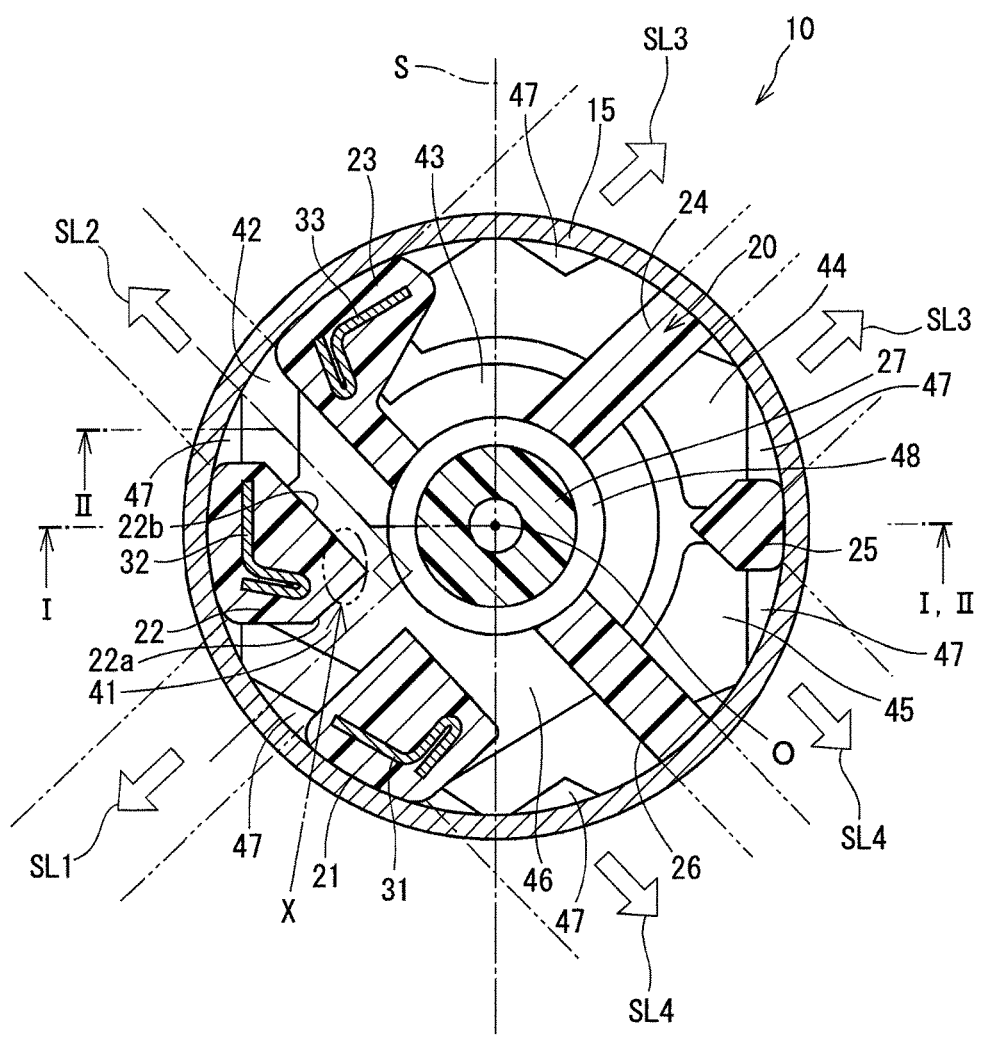
FIG. 4 is a cross-sectional view taken along line IV-IV in FIG. 1.

As shown in FIG. 4, in the state where the cover end is inserted into the housing 15, parts of the outer peripheral portion of the cover end 20 contact the inner wall of the housing 15. Thereby, the cover end 20 is held coaxially with the housing 15. Other parts of the cover end 20, which do not contact the inner wall of the housing 15, form transverse passages 41-46, each of which radially communicates a corresponding one of a plurality of outer passages 47 to an inner passage 48.

Each of the outer passages 47 is a passage that is placed between the inner wall of the housing 15 and the outer wall of the stator 11 of the motor arrangement 50 and axially extends through the motor arrangement 50. The inner passage 48 is a passage that is formed around the tubular portion 27 and communicates with the discharge passage 78. Specifically, the inner passage 48 is an annular passage that is located on a radially outer side of the tubular portion 27 and circumferentially extends all around the tubular portion 27. Details of the transverse passages 41-46 will be described later.

Next, the structure of the motor arrangement 50 will be schematically described. The motor arrangement 50 is a brushless motor that includes the stator 11, a rotor 51 and the shaft 54.

The stator 11 is received in the inside of the housing 15. In this state, the multiple outer passages 47 are formed between the outer wall of the stator 11 and the inner wall of the housing 15 at predetermined circumferential parts.

The stator 11 includes the six cores 12, which are made of a magnetic material, such as iron, and around which the windings 13 are wound. These six cores 12 are joined one after another in the circumferential direction and form the cylindrical tubular body. That is, each one of the cores 12 corresponds to a part that has a central angle of 60 degrees. Surfaces of the cores 12, around which the windings 13 are wound, are resin molded for the purpose of electric insulation. In contrast, inner wall surfaces of the cores 12, which are opposed to the rotor 51, are not resin molded, so that metal surfaces are exposed at the inner wall surfaces of the cores 12.

Figure 2:
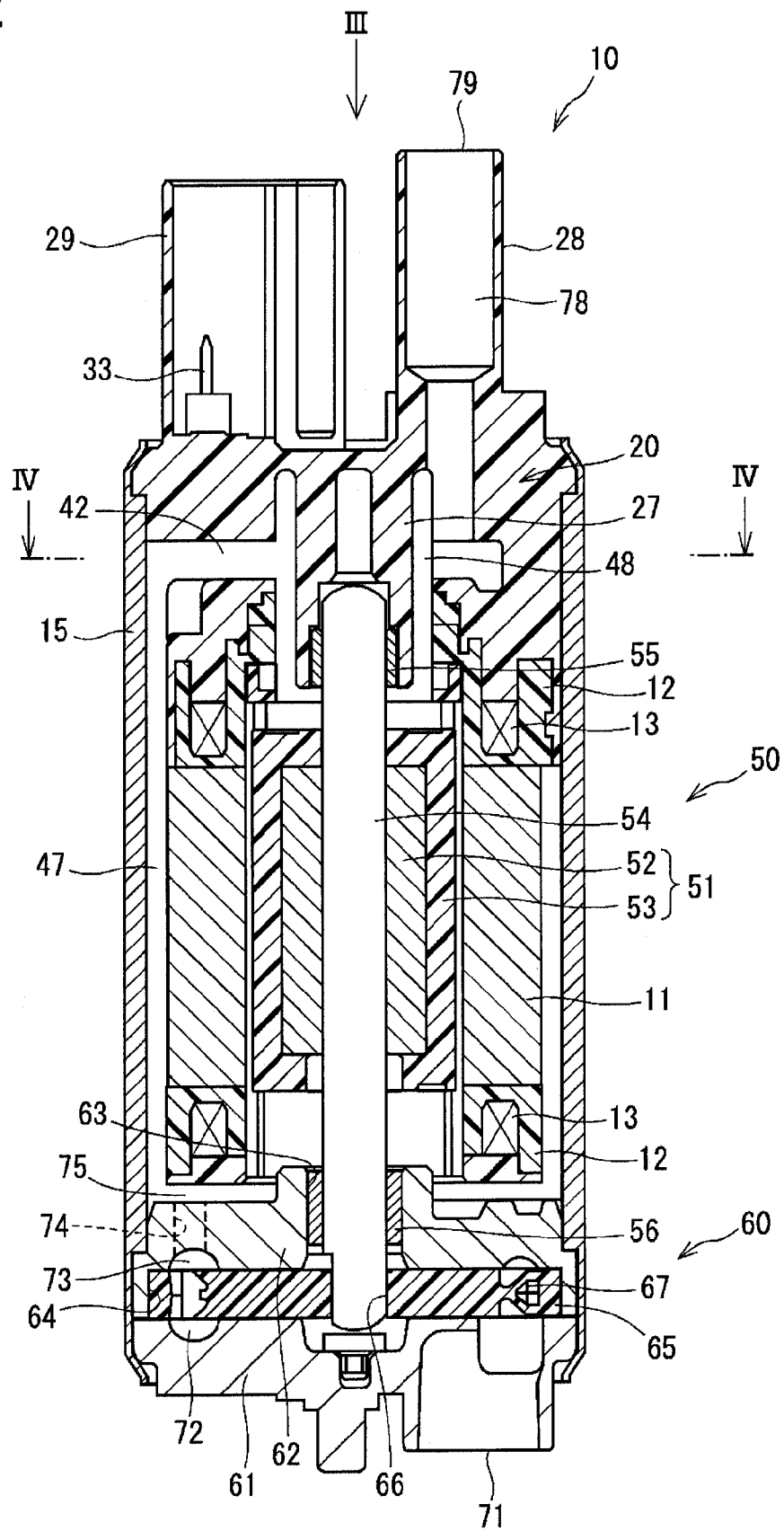
FIG. 2 is an axial cross-sectional view of the fuel pump according to the embodiment of the present disclosure, indicating a cross section taken along line II-II in FIG. 4.
Figure 3:
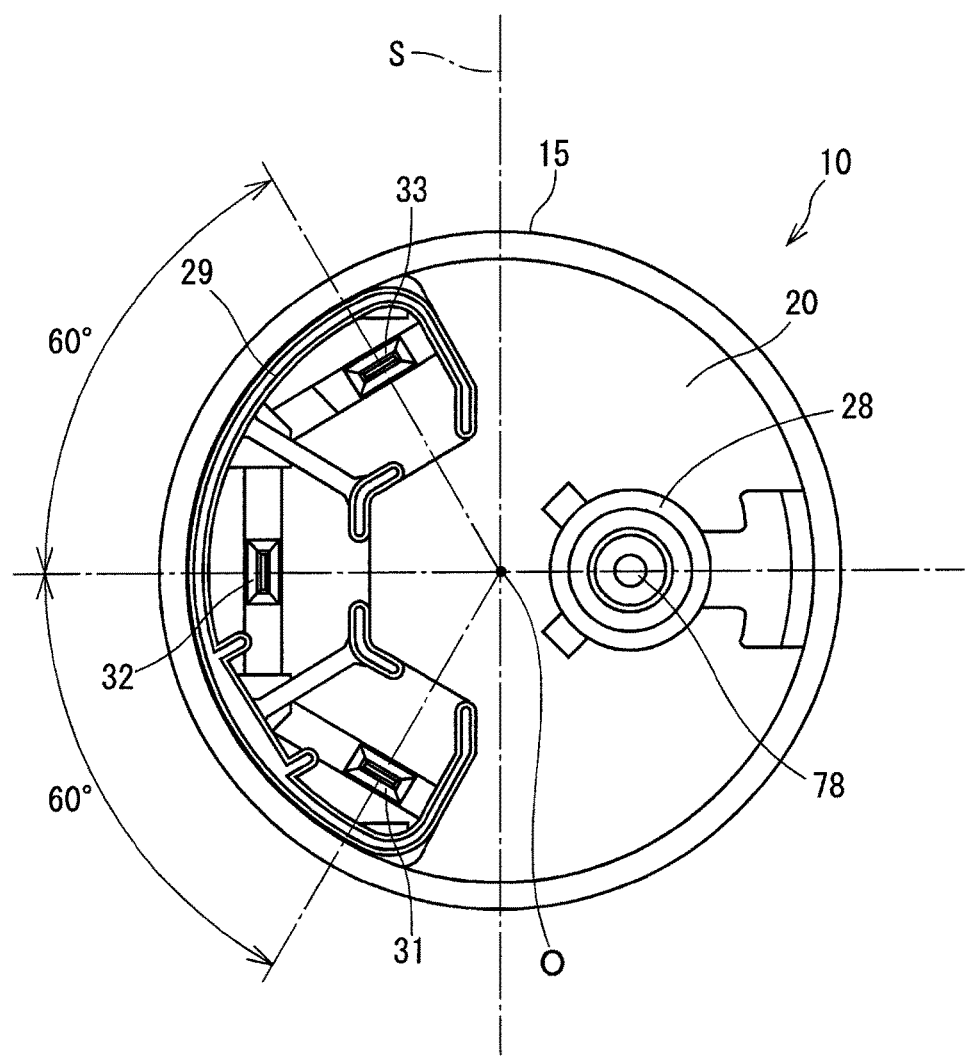
FIG. 3 is a plan view taken in a direction of an arrow III in FIGS. 1 and 2.

At the end portion of the stator 11 where the cover end 20 is placed, the cores 12 of the same phase are electrically connected, and each corresponding core 12 and the corresponding terminal 31, 32, 33 are electrically connected with each other. The electrical connections of the winding portion and the windings 13 are molded with the resin for the purpose of the electric insulation. In the present embodiment, the cover end 20 is integrally molded in this resin molding process. That is, a stator subassembly, around which the windings 13 are wound and in which the terminals 31, 32, 33 are connected to the windings 13, is inserted into a mold, and thereafter the cover end 20 is resin molded in the mold. In this way, as shown in FIGS. 1 and 2, the cover end 20 is resin molded integrally with the one end portion of the stator 11.

The rotor 51 is rotatably received on the inner side of the stator 11. In the present embodiment, a radial gap between the rotor 51 and the stator 11 is set to a relatively small size.

The rotor 51 includes an inner core 52, which is made of a magnetic material and is placed at the inner side of the rotor 51, and a magnet 53, which is placed around the inner core 52 and forms a plurality of magnetic poles. In the magnet 53, the N-poles and the S-poles are alternately arranged one after another in the circumferential direction. The present disclosure is not limited to the above structure, in which the magnet 53 is formed separately from the inner core 52. For example, the core made of the magnetic material may be magnetized to form a plurality of magnetic poles.

The shaft 54 is securely press fitted into a hole that is formed in the inner core 52 of the rotor 51 along the central axis of the inner core 52. Two end portions of the shaft 54 are rotatably supported by the bearing 55, which is placed at the discharge port 79 side, and a bearing 56, which is placed at the suction port 71 side.

When the three-phase electric power is supplied to the windings 13 through the terminals 31, 32, 33, a rotating magnetic field is generated at the stator 11. Thereby, the rotor 51 is rotated together with the shaft 54.

Next, the structure of the pump arrangement 60 will be schematically described. The pump arrangement 60 includes the pump cover 61, a pump casing 62 and an impeller 65.

The pump cover 61 has the suction port 71, which is configured into a tubular form and opens at the lower side of FIG. 1, and the pump cover 61 closes the suction port 71 side end portion of the housing 15. When the suction port 71 side end portion of the housing 15 is radially inwardly crimped against the pump cover 61, the pump cover 61 is fixed at the inside of the housing 15. Thereby, removal of the pump cover 61 from the housing 15 in the axial direction is limited.

The pump casing 62 is configured into a circular plate form and is placed at a location between the motor arrangement 50 and the pump cover 61. A through hole 63 is formed at a center part of the pump casing 62 such that the through hole 63 extends through the pump casing 62 in a plate thickness direction of the pump casing 62. The suction port 71 side bearing 56 is fitted into the hole 63 of the pump casing 62. The bearing 56 cooperates with the discharge port 79 side bearing 55 to rotatably support the two end portions of the shaft 54.

The impeller 65, which serves as a rotatable member, is made of resin and is configured into a generally circular plate form. The impeller 65 is received in a pump chamber 64, which is formed between the pump cover 61 and the pump casing 62. An outer wall of the pump chamber 64 side end portion of the shaft 54 is partially cut to have a D-shape and is fitted into a hole 66, which is formed at a center part of the impeller 65 and is configured into a corresponding D shape. In this way, the impeller 65 is rotated in the pump chamber 64 through the rotation of the shaft 54.

An inlet guide groove 72, into which the fuel is guided from the suction port 71, is formed in the impeller 65 side surface of the pump cover 61. An outlet guide groove 73 is formed in the impeller 65 side surface of the pump casing 62. The outlet guide groove 73 is communicated with a passage 74, which extends through the pump casing 62 in a plate thickness direction of the pump casing 62. The impeller 65 includes blades 67 at a location which corresponds to the inlet guide groove 72 and the outlet guide groove 73.

When the impeller 65 is rotated along with the rotor 51 and the shaft 54 upon energization of the windings 13 of the motor arrangement 50, the fuel at the outside of the fuel pump 1 is guided into the inlet guide groove 72 through the suction port 71. The fuel, which is guided to the inlet guide groove 72, is pressurized through the rotation of the impeller 65 and is guided to the outlet guide groove 73. The pressurized fuel flows through the passage 74 and is guided to an intermediate chamber 75, which is formed on the motor arrangement 50 side of the pump casing 62.

In the present embodiment, the radial gap located between the rotor 51 and the stator 11 does not form the fuel passage. Therefore, the fuel in the intermediate chamber 75 flows through the motor arrangement 50 via the outer passages 47. Then, the fuel enters the inner passage 48 through the transverse passages 41-46 shown in FIG. 4 and reaches the discharge passage 78. Thereafter, the fuel is discharged from the discharge port 79.

Next, the construction of the transverse passages, which form the characteristic feature of the present embodiment, will be described with reference to FIGS. 4 and 5 and in comparison with a comparative example.

As shown in FIG. 4, in the fuel pump 10 of the present embodiment, the cover end 20 is molded to form the six transverse passages 41-46 through use of slide mold parts SL1-SL4. Each of the transverse passages 41-46 communicates the corresponding one of the outer passages 47, which bound with the inner wall of the housing 15, to the inner passage 48, which is formed around the tubular portion 27 and is communicated with the discharge passage 78.

Specifically, the first transverse passage 41 is formed by using the slide mold part SL1 at a location between a resin portion 21, in which the first terminal 31 is embedded, and a resin portion 22, in which the second terminal 32 is embedded. The second transverse passage 42 is formed by using the slide mold part SL2 at a location between the resin portion 22, in which the second terminal 32 is embedded, and a resin portion 23, in which the third terminal 33 is embedded.

The first transverse passage 41 and the second transverse passage 42 are configured into a form of V-shape, which diverges in a radially outer direction, in a view taken in the axial direction. Particularly, in the present embodiment, a crossing angle of this form of V-shape is 90 degrees, so that the first transverse passage 41 and the second transverse passage 42 are perpendicular to each other. That is, the slide mold part SL1 and the slide mold part SL2 are respectively moved in the two direction, which are perpendicular to each other, to form the above-described configuration. A side surface (a planar surface) 22a of the resin portion 22, which is adjacent to the first transverse passage 41, and a side surface (a planar surface) 22b of the resin portion 22, which is adjacent to the second transverse passage 42, are perpendicular to each other.

In FIG. 4, the moving direction of the slide mold part SL1 and the moving direction of the slide mold part SL2 are indicated to be tilted about 45 degrees relative to the reference plane S. Here, it should be noted that this tilt angle is not required to be exactly 45 degrees.

Resin portions 24, 26, each of which radially extends, and a resin portion 25, which is in a form of an island placed on an opposite side of the resin portion 22, are formed on the opposite side of the reference plane S, which is opposite from the terminals 31, 32, 33. The transverse passage 43, which is located between the resin portion 23 and the resin portion 24, and the transverse passage 44, which is located between the resin portion 24 and the resin portion 25, are formed by using the slide mold part SL3, which is moved in a moving direction that is opposite from the moving direction of the slide mold part SL1. The transverse passage 45, which is located between the resin portion 25 and the resin portion 26, and the transverse passage 46, which is located between the resin portion 26 and the resin portion 21, are formed by using the slide mold part SL4, which is moved in a moving direction that is opposite from the moving direction of the slide mold part SL2.

The slide mold parts SL1-SL4 have a known structure that is operated synchronously with a mold opening operation through use of an angular pin in the resin molding mold. Alternatively, the slide mold parts SL1-SL4 may have a structure that is operated independently from the mold opening operation through use of an actuator, such as an air cylinder or a hydraulic cylinder.

A fuel pump of a comparative example, which is comparative to the present embodiment, will now be described with reference to FIG. 5, which indicates a cross section of the fuel pump taken at the same axial position as that of FIG. 4. The fuel pump 19 of the comparative example differs from the present embodiment only with respect to the structure of the transverse passages. In the following description of the comparative example, similar components, which are similar to those of the present embodiment, will be indicated by the same reference numerals and will not be described redundantly for the sake of simplicity.

Figure 5:
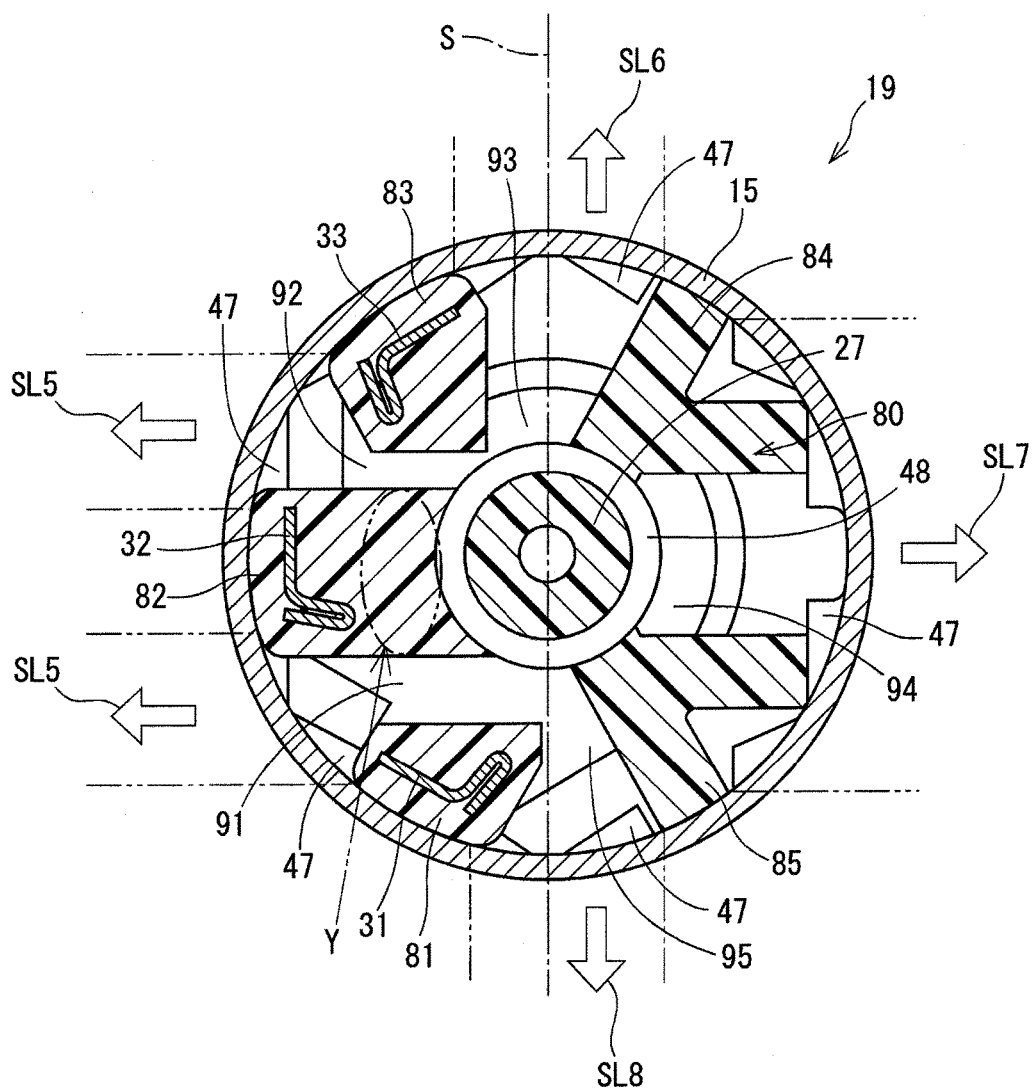
FIG. 5 is a cross-sectional view of a fuel pump of a comparative example, corresponding to FIG. 4.

As shown in FIG. 5, in the fuel pump 19 of the comparative example, the cover end 80 is molded such that each of slide mold parts SL5-SL8, which form five transverse passages 91-95, is moved in a corresponding direction, which is parallel to the reference plane S, or a corresponding direction, which is perpendicular to the reference plane S. Each of the transverse passages 91-95 communicates a corresponding one of the outer passages 47 to the inner passage 48.

Specifically, the first transverse passage 91 is formed between a resin portion 81, in which the first terminal 31 is embedded, and a resin portion 82, in which the second terminal 32 is embedded, and the second transverse passage 92 is formed between the resin portion 82, in which the second terminal 32 is embedded, and a resin portion 83, in which the third terminal 33 is embedded. The first transverse passage 91 and the second transverse passage 92 are parallel to each other and are formed by using the slide mold part SL5, which is moved in the direction that is perpendicular to the reference plane S.

The resin portions 84, 85, each of which is configured into a form of generally V-shape, are formed on the side of the reference plane S, which is opposite from the terminals 31, 32, 33. The transverse passage 93, which is located between the resin portion 83 and the resin portion 84, and the transverse passage 95, which is located between the resin portion 85 and the resin portion 81, are formed by using the slide mold part SL6 and the slide mold part SL8, respectively. The slide mold part SL6 and the slide mold part SL8 are operated in two directions, respectively, which are parallel to the reference plane S and are opposite to each other. The transverse passage 94, which is located between the resin portion 84 and the resin portion 85, is formed by using the slide mold part SL7, which is moved in a direction that is perpendicular to the reference plane S and is opposite from the moving direction of the slide mold part SL5.

In the comparative example of the above construction, a volume of a portion Y, which is located on a radially inner side of the second terminal 32 in the resin portion 82, cannot be sufficiently reduced. Therefore, the portion Y may become a thick wall portion, and thereby the portion Y may more easily accumulate the heat in comparison to the other thin wall portion(s) at the time of molding. Thereby, a sink mark and/or deformation may possibly be generated due to localized shrinkage of the resin material.

Furthermore, in the thick wall portion, gas, which is generated from the hot resin, may not be released to the outside from the thick wall portion and thereby form a void in many cases. The void may possibly result in the shortage of the strength or the deterioration of the appearance. Besides these disadvantages, it is conceivable to have a mechanism of that the void causes shrinkage of the resin in such a manner that the resin is pulled into the void to cause generation of the sink mark in the resin or the deformation of the resin.

The sink mark and/or the deformation of the resin may possibly haven an influence on the positional accuracy of the bearing 55, which is held by the tubular portion 27. Specifically, when the positional accuracy of the bearing 55 is deteriorated, deviation of the central axis of the shaft 54 or tilt of the central axis of the shaft 54 may occur at the time of installing the shaft 54. When this occurs, the required axis accuracy of the shaft 54, such as the required coaxiality or the required perpendicularity of the shaft 54, cannot be ensured. Therefore, the operational performance or the durability of the motor arrangement 50 may be adversely influenced.

In contrast, according to the present embodiment, the first transverse passage 41 and the second transverse passage 42 are configured into the form of V-shape, which diverges in the radially outer direction, in the view taken in the axial direction. A volume of a portion X, which is located on the radially inner side of the second terminal 32 in the resin portion 22, is substantially reduced in comparison to the volume of the portion Y of the comparative example. Therefore, by eliminating the thick wall portion, it is possible to limit the deterioration of the coaxiality or the perpendicularity of the tubular portion 27 caused by the sink mark and/or the deformation at the molding time, and thereby it is possible to ensure the appropriate axis accuracy of the motor arrangement 50.

Furthermore, in the present embodiment, the three terminals 31, 32, 33 are arranged one after another at 60 degree intervals about the axis of the cover end 20. Therefore, the positional relationship of each of the terminals 31, 32, 33 relative to the cores 12 can be equally set in good balance.

In addition, the three terminals 31, 32, 33 are respectively made of the identical members, which are identical to each other. Therefore, the use of the common parts allows a reduction in the number of steps under control and an improvement in the efficiency of the assembling operation.

In addition, in the present embodiment, the first transverse passage 41 and the second transverse passage 42 are perpendicular to each other. That is, the moving direction of the slide mold part SL1 and the moving direction of the slide mold part SL2 can be set to be perpendicular to each other. Therefore, for example, the slide mold part SL1 can be set in a vertical direction of the mold, and the slide mold part SL2 can be set in a forward and backward operating direction of the mold. Thereby, the structure of the mold can be simplified.

Other Embodiments (A) The angular intervals of the three terminals 31, 32, 33 in the circumferential direction are not limited to 60 degrees, which is indicated as the exemplary angle in the above embodiment. Furthermore, the three terminals 31, 32, 33 may be respectively made of different members, which are formed according to different design specifications, respectively. Furthermore, in a case of another terminal construction where a ground terminal and a neutral point terminal are added to the above described terminals to have a total of four terminals, the above embodiment may be applied to three of the four terminals.

(B) The crossing angle between the first transverse passage 41 and the second transverse passage 42 is not limited to 90 degrees, which is indicated as the exemplary crossing angle in the above embodiment. For example, in a case of a mold, in which each of slide mold parts is independently driven by, for example, an air cylinder, the crossing angle can be relatively freely set.

(C) The structure of the cover end 20 of the fuel pump 10, particularly the structure of the cover end 20 other than the locations of the first transverse passage 41 and the second transverse passage 42 is not limited to the structure of the above embodiment. For example, a check valve, which limits backflow of the fuel, may be placed in the discharge passage 78.

(D) The liquid pump of the present disclosure is not limited to the fuel pump and may be used as a pump for pumping another type of liquid, which is other than the fuel. For example, in a urea SCR system of an exhaust gas purification technique, the liquid pump of the present disclosure may be applied as a liquid pump that pumps urea water.

The present disclosure is not limited to the embodiments described above and can be implemented in various other embodiments without departing from the principle of the present disclosure.

The invention claimed is:
1. A liquid pump configured to pump a liquid, comprising:
 a motor arrangement that has:
  a stator, in which a plurality of windings is wound around cores; and
  a rotor, which includes a plurality of magnetic poles and is configured to rotate about a rotational axis of a shaft by a magnetic field generated at the stator;
 a housing that is configured into a tubular form and receives the stator and the rotor, wherein a plurality of outer passages, each of which passes between an inner wall of the housing and an outer wall of the stator and extends through the motor arrangement in an axial direction, is formed in the housing;
 a cover end that is resin molded integrally with one end portion of the stator on one axial side of the motor arrangement and closes an opening of the housing, wherein:
  a tubular portion, which holds a bearing that rotatably supports one end portion of the shaft, is formed along a central axis at a side of the cover end where the motor arrangement is located;
  a discharge conduit, which has a discharge passage in an inside of the discharge conduit, is formed at an opposite side of the cover end, which is opposite from the motor arrangement; and
  a first terminal, a second terminal and a third terminal, which are configured to supply three-phase electric power received from an outside to the plurality of windings on a phase-by-phase basis, are respectively insert molded in a first resin portion, a second resin portion and a third resin portion of the cover end to seal the first terminal, the second terminal and the third terminal from the liquid; and a pump arrangement that includes a rotatable member, which is configured to rotate together with the rotor on another axial side of the motor arrangement to pump the liquid, wherein:

the first terminal, the second terminal and the third terminal are arranged one after another in this order at predetermined intervals in a circumferential direction on an opposite side of an imaginary plane that includes the central axis of the cover end, wherein the opposite side of the imaginary plane is opposite from another side of the imaginary plane where the discharge conduit is formed;

the cover end includes a plurality of transverse passages, which are formed by a plurality of slide mold parts, while each of the plurality of transverse passages radially communicates a corresponding one of the plurality of outer passages to an inner passage, which is formed around the tubular portion and is communicated with the discharge passage; and the plurality of transverse passages includes:
  a first transverse passage, which is formed between the first resin portion, in which the first terminal is insert molded, and the second resin portion, in which the second terminal is insert molded, in the circumferential direction, and
  a second transverse passage, which is formed between the second resin portion, in which the second terminal is insert molded, and the third resin portion, in which the third terminal is insert molded, in the circumferential direction; and
the first transverse passage and the second transverse passage together are a V-shape, which diverges in a radially outer direction when viewed in the axial direction; and
inner surfaces of the V-shape that bound the second resin portion are configured to limit deterioration of a coaxiality of the tubular portion caused by a deformation at a time of molding.

2. The liquid pump according to claim 1, wherein the first terminal, the second terminal and the third terminal are arranged at 60 degree intervals about the central axis of the cover end.

3. The liquid pump according to claim 1, wherein the first terminal, the second terminal and the third terminal are respectively made of identical members, which are identical to each other.

4. The liquid pump according to claim 1, wherein the first transverse passage and the second transverse passage are perpendicular to each other.

5. The liquid pump according to claim 1, wherein the liquid pump is a fuel pump, which pumps fuel that serves as the liquid and is drawn from a fuel tank.

6. The liquid pump according to claim 1, wherein:
the second resin portion includes a first side surface that forms the first transverse passage, and includes a second side surface that forms the second transverse passage; and
the first side surface is perpendicular to the second side surface when viewed in the axial direction.

7. A liquid pump configured to pump a liquid, comprising:
a motor arrangement that has:
  a stator, in which a plurality of windings is wound around cores; and
  a rotor, which includes a plurality of magnetic poles and is configured to rotate about a rotational axis of a shaft by a magnetic field generated at the stator;
a housing that is configured into a tubular form and receives the stator and the rotor, wherein a plurality of outer passages, each of which passes between an inner wall of the housing and an outer wall of the stator and extends through the motor arrangement in an axial direction, is formed in the housing;
a cover end that is resin molded integrally with one end portion of the stator on one axial side of the motor arrangement and closes an opening of the housing, wherein:
  a tubular portion, which holds a bearing that rotatably supports one end portion of the shaft, is formed along a central axis at a side of the cover end where the motor arrangement is located;
  a discharge conduit, which has a discharge passage in an inside of the discharge conduit, is formed at an opposite side of the cover end, which is opposite from the motor arrangement; and
  a first terminal, a second terminal and a third terminal, which are configured to supply three-phase electric power received from an outside to the plurality of windings on a phase-by-phase basis, are respectively insert molded in a first resin portion, a second resin portion and a third resin portion of the cover end to seal the first terminal, the second terminal and the third terminal from the liquid; and
a pump arrangement that includes a rotatable member, which is configured to rotate together with the rotor on another axial side of the motor arrangement to pump the liquid, wherein:
the first terminal, the second terminal and the third terminal are arranged one after another in this order at predetermined intervals in a circumferential direction on an opposite side of an imaginary plane that includes the central axis of the cover end, wherein the opposite side of the imaginary plane is opposite from another side of the imaginary plane where the discharge conduit is formed;
the cover end includes a plurality of transverse passages, which are formed by a plurality of slide mold parts, while each of the plurality of transverse passages radially communicates a corresponding one of the plurality of outer passages to an inner passage, which is formed around the tubular portion and is communicated with the discharge passage; and
the plurality of transverse passages includes:
  a first transverse passage, which is formed between the first resin portion, in which the first terminal is insert molded, and the second resin portion, in which the second terminal is insert molded, in the circumferential direction, and
  a second transverse passage, which is formed between the second resin portion, in which the second terminal is insert molded, and the third resin portion, in which the third terminal is insert molded, in the circumferential direction;
the first transverse passage and the second transverse passage form a V-shape, which diverges in a radially outer direction when viewed in the axial direction;

the second resin portion includes a first side surface that forms the first transverse passage, and includes a second side surface that forms the second transverse passage; and the first side surface is perpendicular to the second side surface when viewed in the axial direction.

8. The liquid pump according to claim 7, wherein the first terminal, the second terminal and the third terminal are arranged at 60 degree intervals about the central axis of the cover end.

9. The liquid pump according to claim 7, wherein the first terminal, the second terminal and the third terminal are respectively made of identical members, which are identical to each other.

10. The liquid pump according to claim 7, wherein the first transverse passage and the second transverse passage are perpendicular to each other.

11. The liquid pump according to claim 7, wherein the liquid pump is a fuel pump, which pumps fuel that serves as the liquid and is drawn from a fuel tank.

\* \* \* \* \*